(12) United States Patent
Glausch et al.

(10) Patent No.: US 6,488,758 B2
(45) Date of Patent: Dec. 3, 2002

(54) STABILIZATION OF PEARL LUSTER PIGMENTS

(75) Inventors: Ralf Glausch, Muehltal (DE); Marita Jekel, Darmstadt (DE)

(73) Assignee: Merck Patent Gesellschaft mit beschraenkter Haftung (DE)

( * ) Notice: Subject to any disclaimer, the term of this patent is extended or adjusted under 35 U.S.C. 154(b) by 0 days.

(21) Appl. No.: 09/985,941

(22) Filed: Nov. 6, 2001

(65) Prior Publication Data

US 2002/0112645 A1 Aug. 22, 2002

(30) Foreign Application Priority Data

Nov. 6, 2000 (DE) .......................... 100 54 980

(51) Int. Cl.$^7$ .............................. C04B 14/20
(52) U.S. Cl. .................. 106/417; 106/404; 106/415; 106/418; 106/429; 106/430; 106/431; 106/436; 106/438; 106/439; 106/450; 106/453; 106/456
(58) Field of Search ................. 106/404, 415, 106/417, 418, 429, 430, 431, 436, 438, 439, 450, 453, 456

(56) References Cited

U.S. PATENT DOCUMENTS

| | | | |
|---|---|---|---|
| 4,482,389 A | | 11/1984 | Franz et al. |
| 5,035,748 A | * | 7/1991 | Burow et al. ............. 106/416 |
| 5,458,976 A | | 10/1995 | Horino et al. |
| 5,472,491 A | * | 12/1995 | Duschek et al. ........... 106/415 |
| 5,629,400 A | * | 5/1997 | Standke et al. ............ 524/385 |
| 5,679,147 A | * | 10/1997 | Standke et al. ........ 106/287.11 |
| 5,759,255 A | * | 6/1998 | Venturini et al. .......... 106/417 |
| 6,176,918 B1 | | 1/2001 | Glausch et al. |

FOREIGN PATENT DOCUMENTS

| | | |
|---|---|---|
| EP | 0104516 | 4/1984 |
| EP | 0 268 918 | 1/1988 |
| EP | 0 632 109 A1 | 4/1995 |
| EP | 0 632 109 B1 | 4/1995 |
| JP | 8-208418 | 8/1996 |
| WO | WO 89/13426 | 9/1983 |
| WO | WO 98/13426 | 4/1998 |

OTHER PUBLICATIONS

European Search Report for EP 1203794 A1.
European Search Report for EP 1203795 A1.

* cited by examiner

*Primary Examiner*—Mark L. Bell
*Assistant Examiner*—Shalie A. Manlove
(74) *Attorney, Agent, or Firm*—Millen, White, Zelano & Branigan, P.C.

(57) ABSTRACT

The invention relates to a pearl luster pigment which may possess a first, inner layer, consisting of a platelet-shaped substrate, a second layer, comprising one or more metal oxides, the first and second layers forming a calcined base pigment, a third layer, comprising the corresponding uncalcined oxide, hydroxide or oxide hydrate of the oxide of the second layer, a fourth layer, comprising oxides, hydroxides and/or oxide hydrates of silicon or aluminum, a fifth layer, comprising oxides, hydroxides and/or oxide hydrates of silicon, aluminum, zirconium and/or cerium, this layer differing from the fourth layer, and a sixth layer, comprising one or more organofunctional coupling reagents. The present invention relates to also a preparation process, and the use of the pigments in paints, inks, plastics, coatings and cosmetics.

17 Claims, No Drawings

STABILIZATION OF PEARL LUSTER PIGMENTS

The invention relates to aftercoated pearl luster pigments and to a process for preparing them. The invention further relates to the use of these pigments.

EP 0 632 109 B1 discloses pearl luster pigments which for use in coating compositions are subjected to an aftertreatment in order to enhance their stability.

The pearl luster pigments known from EP 0 632 109 possess the following general layer sequence: the first "layer" is formed by the substrate, e.g. mica, the second layer is a metal oxide layer, e.g. titanium dioxide or iron (III) oxide, and these two layers form the base pigment. Atop the calcined base pigment, beginning with a third layer, the aftercoating, as it is known, is applied. The third layer comprises oxides, hydroxides and/or oxide hydrates of silicon, or aluminum, the fourth layer comprises oxides, hydroxides and/or oxide hydrates of silicon, aluminum, zirconium and/or cerium, and is different from the third layer, and the fifth layer comprises organofunctional coupling agents, e.g. silanes or zirconium aluminates.

Despite the stabilizing aftercoating of layers three to five described above, the pearl luster pigments, especially those based on mica and coated in the second layer with iron (III) oxide, are unsuitable for use in all fields, since under extreme stresses even higher stability of the pigments would be necessary.

Similar comments apply, in particular, to the mica-based pearl luster pigments coated in the second layer with titanium dioxide or other metal oxides, such as chromium oxide, zirconium dioxide, tin dioxide or zinc oxide; although they are in many cases more stable than the iron (III) oxide-coated micas, they likewise cannot be used without restrictions.

The aftercoated pearl luster pigments known from the prior art, furthermore, possess the disadvantage that their orientation in coating films is not optimal; in other words, an improvement in the parallel alignment of the pigments with respect to the film coat would be desirable in order to enhance the luster properties.

SUMMARY OF THE INVENTION

One of the features of the invention is to increase the stability of such pigments and to provide pigments which possess improved orientation within coating films.

This feature can be achieved in accordance with the invention by the provision of pigments having the following layer sequence:

- a first layer, consisting of a platelet-shaped substrate,
- a second layer,
    - comprising one or more metal oxides,
    - the first and second layers forming a calcined base pigment,
- a third layer, comprising the corresponding uncalcined oxide, hydroxide or oxide hydrate of the oxide of the second layer,
- a fourth layer, comprising oxides, hydroxides and/or oxide hydrates of silicon or aluminum,
- a fifth layer, comprising oxides, hydroxides and/or oxide hydrates of silicon, aluminum, zirconium and/or cerium, this layer differing from the fourth layer, and
- a sixth layer, comprising one or more organofunctional coupling agents.

The third layer in this sequence adopts the function of an adhesion promoter and embraces preferably from 0.1 to 10% by weight, more preferably from 1 to 5% by weight, and even more preferably 1–3% by weight, based on the base pigment.

Suitable platelet-shaped substrates for the base pigment are the substrates specified in EP 632 109 B1, such as mica, kaolin or glass, for example. Particular preference is given, however, to mica as the base substrate.

Preferably and optionally independently, the first layer has a thickness of 400–2000 nm. The second layer has a thickness of 50–300 nm, the third layer has a thickness of 5–30 nm, the fourth layer has a thickness of 10–50 nm, and the fifth layer has a thickness of 10–50 nm.

Suitable metal oxides of the second layer are, for example, iron (III) oxide and/or titanium dioxide or other metal oxides, such as chromium oxide, zirconium dioxide, tin dioxide or zinc oxide, and the oxides may also be present in mixtures. Preferred metal oxides include iron (III) oxide and/or titanium dioxide. Particularly high improvements over the pearl luster pigments known from EP 632 109 B1 are achieved in the case of the iron (III) oxide-coated substrates. Desirably, the second layer is 25–80% by weight with respect to the base pigment, i.e. first plus second layer.

Suitable organofunctional coupling agents are the coupling agents disclosed in EP 632 109 B1. They include, in particular, silanes, zirconium aluminates, zirconates or titanates, the silanes preferably possessing the structure $Y-(CH_2)_n-SiX_3$ in which n is 2-8, Y is an organofunctional group, e.g. an amino, methacrylic, vinyl, alkyl, aryl, halogen and/or epoxy group, and X is a silicon-functional group which following its hydrolysis reacts with active sites of an inorganic substrate or by condensation with other silicon compounds. This group Y may comprise, for example a hydroxy, a halogen or an alkoxy group.

In addition to these substantially hydrophilic coupling agents, it is also possible to use hydrophilic silanes, especially the aryl-, alkyl- and fluoroalkyl- substituted di- and trimethoxysilanes. These include, for example, phenethyltrimethoxysilane, propyltrimethoxysilane, butyltrimethoxysilane, isobutyltrimethoxysilane, hexyltrimethoxysilane, octyltrimethoxysilane, 1H, 1H, 2H, 2H-perfluorodecyltrimethoxysilane and (3,3,3-trifluoropropyl)methyldimethoxysilane.

The concentration of coupling agents can be 0.2–1.2% by weight with respect to the base pigment.

A further feature is to provide a process for obtaining the pearl luster pigments of the invention.

This feature can be achieved by the provision of a multistage process in which the calcined, platelet-shaped substrate coated with one or more metal oxides is suspended in water, heated at from 25 to 100° C., preferably from 40 to 80° C., and adjusted to a pH of from 3 to 11, preferably from 5 to 9, in a first stage one or more water-soluble metal salts are added which correspond to the calcined metal oxides of the metal oxide coating of the platelet-shaped substrate, these salts are deposited in whole or in part as oxide, hydroxide and/or oxide hydrate, followed by heating at from 30 to 100° C., preferably from 40 to 75° C., and adjustment to a pH of from 3 to 9, preferably from 6 to 7, in a second stage a water-soluble silicate and/or aluminum salt is added, and is deposited in whole or in part as oxide, hydroxide and/or oxide hydrate, in a third stage, by adding at least one water-soluble silicate, aluminum salt, cerium salt and/or zirconium salt at a pH in the range from 3 to 9, preferably from 6 to 7, the corresponding oxides, hydroxides or oxide hydrates thereof are deposited, it being necessary for these to differ from those of the second stage, and in a fourth stage at least one organofunctional coupling agent is added and is deposited at a pH of from 3 to 9, preferably from 6 to 8.

As calcined platelet-shaped substrates coated with metal oxides it is possible to use the substrates already mentioned above with the abovementioned metal oxide coatings, which are available commercially under the designation Iriodin® (manufacturer: E. Merck, Darmstadt).

A suitable water-soluble silicate is preferably sodium silicate; suitable water-soluble aluminum salts, cerium salts and zirconium salts are, in general, all water-soluble salts of these metals, although the readily obtainable halides and halide hydrates, for example, are appropriate.

Organofunctional coupling reagents used are preferably those mentioned above.

The aftercoating process of the invention may be carried out as described above in one operation without isolating and working up the pigment after the first precipitation reaction (first stage). However, it is also possible to isolate the pigment after the first stage, i.e., after the application of the adhesion-promoting layer.

The pearl luster pigments coated in accordance with the invention are employed in particular in connection with the pigmenting of inks, such as printing inks, for example, and plastics, such as polymer films, for example, and also coating compositions, such as paints, for example. However, they are also employed in other areas in which the abovementioned improved properties play a part, such as in the pigmentation of cosmetics, for example.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure of all cited applications, patents and publications and of corresponding DE application No. 10054980.2, filed Nov. 6, 2000, is hereby incorporated by reference.

EXAMPLES

Different pearl luster pigments were aftercoated by means of the aftertreatment process of the invention.

a) Iron oxide pigment without isolation (prepared in a reactor) 100 g of Iriodin® 504 Red are suspended in 900 ml of deionized water and heated to 40° C. with vigorous stirring.

The suspension is adjusted to a pH of 9.0 using 2.5% NaOH (all stated pH values are determined using appropriate pH indicator paper).

Over the course of approximately 30 minutes, a solution of 18.66 g of $FeCl_3$ in 74.64 g of deionized water (corresponding to a 3% $FeCl_3$ solution) is added dropwise to the suspension. The pH falls over the course of 5 minutes to 3.2 and is kept constant at this level using 10% sodium hydroxide solution. After the endpoint has been reached, the pigment suspension is adjusted to a pH of 5.0 and is subsequently stirred for approximately 15 minutes.

Subsequently, over the course of 30 minutes, a solution of 2.7 ml of sodium silicate (370 g of $SiO_2$ per litre) in 150 ml of deionized water is added dropwise to the pigment suspension. The pH is kept constant using 2.5% hydrochloric acid. After the end of the addition, stirring is continued at 40° C. for 15 minutes. Thereafter the pH is adjusted to 6.5 over the course of 10 minutes using 2.5% hydrochloric acid and the suspension is subsequently stirred at 40° C. for 15 minutes. Then 1.35 g of sodium sulfate, 2.30 g of aluminum chloride hexahydrate and 1.10 g of cerium (II) chloride heptahydrate, as solids, are added to the suspension, the pH dropping to 4.0.

Subsequently, over the course of 20 minutes, the suspension is heated to 75° C. and stirred at 75° C. for a further 75 minutes, the pH dropping to 3.3.

Subsequently, 3.0 g of Dynasilan AMMO (3-aminopropyltrimethoxysilane from Hüls) in pure form are added over the course of 10 minutes and the pH is kept constant using the abovementioned hydrochloric acid. After the end of the addition, stirring is continued at 75° C. for 2 h, during which the silane hydrolyzes fully and reacts with the pigment surface.

Subsequently, the system is adjusted to a pH of 8.0 using 2.5% sodium hydroxide solution very slowly over the course of 60 minutes. During this procedure, the oxides and/or oxide hydrates and the silane are deposited completely in the form of a mixed precipitation.

Subsequently, stirring is continued at 75° C. for 1 h for after reaction, the pH falling to 7.0. The product is filtered off over a suction filter, washed salt-free with deionized water and dried at 140° C. for approximately 16 h.

b) Iron oxide with isolation 100 g of Iriodine® 504 Red are suspended in 900 ml of deionized water and heated to 40° C. with vigorous stirring.

The suspension is adjusted to a pH of 9.0 using 2.5% sodium hydroxide solution (all stated pH values are determined using appropriate pH indicator paper). Over the course of approximately 30 minutes, a solution of 18.66 g of $FeCl_3$ in 74.64 g of deionized water (corresponding to a 3% $FeCl_3$ solution) is added dropwise to the suspension. The pH falls over the course of 5 minutes to 3.2 and is kept constant at this level using 10% sodium hydroxide solution. After the endpoint has been reached, the pigment suspension is adjusted to a pH of 5.0 and is subsequently stirred for approximately 15 minutes.

The pigment is isolated (filtered off with suction), washed with approximately 12 l of deionized water and dried at 110° C. for approximately 16 h.

The modified pigment thus obtained is suspended in 900 ml of deionized water, heated to 40° C. with vigorous stirring, and adjusted to a pH of 9.0 using 2.5% sodium hydroxide solution.

Subsequently, over the course of 30 minutes, a solution of 2.7 ml of sodium silicate (370 g of $SiO_2$ per litre) in 150 ml of deionized water is added dropwise to the pigment suspension. The pH is kept constant using 2.5% hydrochloric acid. After the end of the addition, stirring is continued at 40° C. for 15 minutes. Thereafter, the pH is adjusted to 6.5 over the course of 10 minutes using 2.5% hydrochloric acid and the suspension is subsequently stirred at 40° C. for 15 minutes. Then 1.35 g of sodium sulfate, 2.30 g of aluminum chloride hexahydrate and 1.10 g of cerium (II) chloride heptahydrate, as solids, are added to the suspension, the pH dropping to 4.0.

Subsequently, over the course of 20 minutes, the suspension is heated to 75° C. and stirred at 75° C. for a further 75 minutes, the pH dropping to 3.3.

Subsequently, 3.0 g of Z6040 (3-glycidyloxypropyltrimethoxysilane from Dow Corning) in pure form are added over the course of 10 minutes and the pH is kept constant using the above-mentioned hydrochloric acid. After the end of the addition, stirring is continued at 75° C. for 2 h, during which the silane hydrolyzes fully and reacts with the pigment surface.

Subsequently, the system is adjusted to a pH of 8.0 using 2.5% sodium hydroxide solution very slowly over the course of 60 minutes. During this procedure, the oxides and/or oxide hydrates and the silane are deposited completely in the form of a mixed precipitation.

Subsequently, stirring is continued at 75° C. for 1 h for after reaction, the pH falling to 7.0.

The product is filtered off over a suction filter, washed salt-free with deionized water and dried at 140° C. for approximately 16 h.

c) Titanium oxide pigment without isolation (prepared in a reactor) 100 g of Iriodin® 225 Rutile Pearl-blue are suspended in 900 ml of deionized water and heated to 40° C. with vigorous stirring.

The suspension is adjusted to a pH of 9.0 using 2.5% NaOH (all stated pH values are determined using appropriate pH indicator paper).

Over the course of approximately 30 minutes, a solution of 20.54 g of $TiCl_4$ in 74.64 g of deionized water is added dropwise to the suspension. The pH falls over the course of 5 minutes to 3.2 and is kept constant at this level using 10% sodium hydroxide solution. After the endpoint has been reached, the pigment suspension is adjusted to a pH of 5.0 and is subsequently stirred for approximately 15 minutes.

Subsequently, over the course of 30 minutes, a solution of 2.7 ml of sodium silicate (370 g of $SiO_2$ per litre) in 150 ml of deionized water is added dropwise to the pigment suspension. The pH is kept constant using 2.5% hydrochloric acid. After the end of the addition, stirring is continued at 40° C. for 15 minutes. Thereafter, the pH is adjusted to 6.5 over the course of 10 minutes using 2.5% hydrochloric acid and the suspension is subsequently stirred at 40° C. for 15 minutes. Then 1.35 g of sodium sulfate, 2.30 g of aluminum chloride hexahydrate and 1.10 g of cerium (II) chloride heptahydrate, as solids, are added to the suspension, the pH dropping to 4.0.

Subsequently, over the course of 20 minutes, the suspension is heated to 75° C. and stirred at 75° C. for a further 75 minutes, the pH dropping to 3.3.

Subsequently, 3.0 g of Dynasilan MEMO (3-methacryloxy-trimethoxysilane from Degussa-Hüls AG) in pure form are added over the course of 10 minutes and the pH is kept constant using the above-mentioned hydrochloric acid. After the end of the addition, stirring is continued at 75° C. for 2 h, during which the silane hydrolyzes fully and reacts with the pigment surface.

Subsequently, the system is adjusted to a pH of 8.0 using 2.5% sodium hydroxide solution very slowly over the course of 60 minutes. During this procedure, the oxides and/or oxide hydrates and the silane are deposited completely in the form of a mixed precipitation.

Subsequently, stirring is continued at 75° C. for 1 h for after reaction, the pH falling to 7.0.

The product is filtered off over a suction filter, washed salt-free with deionized water and dried at 140° C. for approximately 16 h.

Results of the Weathering Tests

The pigment specimens a) to c) were incorporated into an aqueous coating system based on an acrylate/methacrylate binder and the test specimens were prepared by spray application.

The specimens a) to c) were weathered by means of a condensation test in accordance with DIN 50017 and were evaluated one hour after the end of exposure.

The blistering was evaluated visually in accordance with DIN 53209. "m" here is a measure of the number of blisters per unit area, while "g" is a measure of the size of the blisters. The evaluation scale ranges from 0 (very good) to 5 (very poor).

The swelling was likewise assessed visually in accordance with DIN 53230. The relative evaluation scale ranges from 0 (unchanged) to 5 (very severely changed).

The adhesion was determined visually in accordance with DIN 53151, the relative evaluation scale ranging from 0 (very good) to 5 (very poor).

The table contains the test results of specimens a) to c), and also the comparative samples with Iriodin® 225 WR II and Iriodin® 504 WR II and a pigment-free blank sample as aqueous clearcoat. The pigments Iriodin® 225 WR II (titanium dioxide pigment) and Iriodin® 504 WR II (iron oxide pigment) are prior art and do not possess the adhesion-promoting interlayer of the invention.

TABLE

Weathering results of the aftertreated pigments

| Example No. | Blistering | Swelling | Adhesion |
|---|---|---|---|
| a) | m 1/g 1 | Q1 | 1 |
| b) | m 1/g 1 | Q1 | 1 |
| c) | m 0/g 0 | Q0 | 0 |
| Iriodin ® 225 WR II | m 2/g 1 | Q1-2 | 1-2 |
| Iriodin ® 504 WR II | m 3/g 4 | Q3-4 | 4 |
| Blank sample | m 0/g 0 | Q0 | 0 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A pearl luster pigment comprising
   a first, inner layer comprising a platelet-shaped subsrate,
   a second layer, comprising one or more metal oxides, wherein the first and second layer form a calcined base pigment,
   a third layer, comprising the corresponding uncalcined oxide, hydroxide or oxide hydrate of the oxide of the second layer,
   a fourth layer, comprising an oxide, a hidroxide and/or an oxide hydrate of silicon or aluminum,
   a fifth layer, comprising an oxide, a hydroxide and/or an oxide hydrate of silicon, aluminum, zirconium and/or cerium, and
   a sixth layer, comprising at least one organofunctional coupling reagent.

2. A pearl luster pigment according to claim 1, wherein the substrate is mica.

3. A pearl luster pigment according to claim 1, wherein the metal oxide of the second layer is iron (III) oxide or titanium dioxide.

4. A pearl luster pigment according to claim 1, wherein the organofunctional coupling reagent is a silane, a zirconium aluminate, zirconate or titanate.

5. A process for preparing a pearl luster pigment according to claim 1, comprising:
   suspending a calcined, platelet-shaped substrate coated with at least one metal oxide in water, heating at 25–100° C., and adjusting to a pH of 3–11;
   adding at least water-soluble metal salt corresponding to the calcined metal oxide of the metal oxide coating of the platelet-shaped substrate;

depositing these salts in whole or in part as oxide, hydroxide and/or oxide hydrate, followed by heating at 30–100° C., and adjusting to a pH of 3–9;

adding a water-soluble silicate and/or aluminum salt, depositing in whole or in part as an oxide, a hydroxide and/or an oxide hydrate, by adding at least one water-soluble silicate, aluminum salt, cerium salt and/or zirconium salt at a pH of 3–9, depositing the corresponding oxide, hydroxide or oxide hydrate thereof, differing from the earlier deposited oxide, hydroxide, and/or oxide hydrate; and adding and depositing at least one organic coupling agent at a pH of 3–9.

6. A process according to claim 5, further comprising isolating, washing, and drying the pigment after suspending and before adding at least one water-soluble metal salt.

7. A process according to claim 5, further comprising separating off by sedimentation, washing, filtering, and drying at 80–160° C., the pigment after adding a water-soluble silicate and/or aluminum salt.

8. A process according to claim 5, wherein the calcined, platelet-shaped substrate coated with at least one metal oxide is a mica coated with iron (III) oxide and/or titanium dioxide.

9. A process according to claim 5, wherein the organofunctional coupling reagent is a silane, zirconium aluminate or titanate.

10. A method for pigmenting, a paint, an ink, a plastic, a coating or a cosmetic by incorporating a pearl luster pigment according to claim 1.

11. A paint, an ink, a plastic, a coating, or a cosmetic comprising a pearl luster pigment according to claim 1.

12. A process according to claim 5, wherein the water for suspending the calcined, platelet-shaped substrate is heated from 40 to 80° C.

13. A process according to claim 5, wherein the water for suspending the calcined, platelet-shaped substrate is adjusted to a pH of 5–9.

14. A process according to claim 5, wherein the heating after depositing the salts is at a temperature of 40–75° C. and a pH of 6–7.

15. A process according to claim 5, wherein the adding of at least one water-soluble silicate, aluminum salt, cerium salt and/or zirconium salt is at a pH of 6–7.

16. A process according to claim 5, wherein the adding and depositing of at least one organofunctional coupling agent is at a pH of 6–8.

17. A process according to clam 7, wherein the drying is at 120–160° C.

* * * * *

UNITED STATES PATENT AND TRADEMARK OFFICE
CERTIFICATE OF CORRECTION

PATENT NO.    : 6,488,758 B2
DATED         : December 3, 2002
INVENTOR(S)   : Ralf Glausch et al.

It is certified that error appears in the above-identified patent and that said Letters Patent is hereby corrected as shown below:

<u>Title page,</u>
Item [30], Foreign Application Priority Data, "100 54 980" should read
-- 100 54 980.2 --

<u>Column 6,</u>
Line 45, "hidroxide" should read -- hydroxide --
Line 47, "a fifth layer, comprising" should read -- a fifth layer, differing from the fourth layer, comprising --

<u>Column 8,</u>
Lines 2-3, "zirconium aluminate or titanate" should read -- zirconium aluminate, zirconate or titanate --
Line 22, "clam 7" should read -- claim 7 --

Signed and Sealed this

Twenty-first Day of October, 2003

JAMES E. ROGAN
*Director of the United States Patent and Trademark Office*